(12) United States Patent
Nakajima et al.

(10) Patent No.: US 6,279,941 B1
(45) Date of Patent: *Aug. 28, 2001

(54) HEAD-PROTECTING AIR BAG DEVICE

(75) Inventors: Hiroki Nakajima, Nagoya; Hiroshi Ishiyama, Toyota; Toshinori Tanase, Motosu-gun; Yasuo Ochiai, Haguri-gun, all of (JP)

(73) Assignees: Toyota-Jidosha Kabushiki Kaisha, Toyota; Toyota Gosei Co., Ltd., Nishikasugai-gun, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,728

(22) Filed: Aug. 27, 1998

(30) Foreign Application Priority Data

Aug. 28, 1997 (JP) .................................................... 9-233077
May 12, 1998 (JP) .................................................. 10-128595

(51) Int. Cl.[7] .................................................. B60R 21/16
(52) U.S. Cl. ...................................... 280/728.2; 280/730.2
(58) Field of Search ............................ 280/728.2, 730.1, 280/730.2; 403/279, 283, 375

(56) References Cited

U.S. PATENT DOCUMENTS

| 4,688,960 | * | 8/1987 | Bien ................................ 403/375 X |
| 5,201,564 | * | 4/1993 | Price . |
| 5,322,322 | | 6/1994 | Bark et al. . |
| 5,462,308 | | 10/1995 | Seki et al. . |
| 5,480,181 | | 1/1996 | Bark et al. . |
| 5,540,459 | | 7/1996 | Daniel . |
| 5,588,672 | | 12/1996 | Karlow et al. . |
| 5,605,346 | | 2/1997 | Cheung et al. . |
| 5,660,414 | | 8/1997 | Karlow et al. . |
| 5,700,029 | * | 12/1997 | Enders . |
| 5,755,457 | * | 5/1998 | Specht ........................... 280/730.2 X |
| 5,788,270 | * | 8/1998 | Haland et al. ................. 280/730.2 X |
| 5,791,683 | * | 8/1998 | Shibata et al. ................ 280/730.1 X |
| 5,865,462 | * | 2/1999 | Robins et al. ..................... 280/730.2 |
| 5,884,937 | * | 3/1999 | Yamada .............................. 280/730.2 |
| 5,899,491 | * | 5/1999 | Tschaeschke ..................... 280/730.2 |
| 5,924,722 | * | 7/1999 | Koide et al. ....................... 280/730.2 |
| 5,924,723 | * | 7/1999 | Brantman et al. ................ 280/730.2 |
| 5,938,233 | * | 8/1999 | Specht .............................. 280/730.2 |

FOREIGN PATENT DOCUMENTS

| 296 03 316 | | 8/1996 | (DE) . |
| 296 05 896 | | 9/1996 | (DE) . |
| 54-2519 | | 2/1979 | (JP) . |
| 4-93243 | | 8/1992 | (JP) . |
| 6-32194 | | 2/1994 | (JP) . |
| 6-227340 | | 8/1994 | (JP) . |
| 8-301060 | | 11/1996 | (JP) . |
| 9-109817 | | 4/1997 | (JP) . |
| 9-156450 | | 6/1997 | (JP) . |
| 9207701 | * | 8/1997 | (JP) . |
| 9249089 | * | 9/1997 | (JP) . |
| 9315253 | * | 12/1997 | (JP) . |
| 10138857 | * | 5/1998 | (JP) . |
| 101388856 | * | 5/1998 | (JP) . |
| 96/26087 | | 8/1996 | (WO) . |

* cited by examiner

Primary Examiner—Brian L. Johnson
Assistant Examiner—Bryan Fischmann
(74) Attorney, Agent, or Firm—Pillsbury Winthrop LLP

(57) ABSTRACT

Mounting portions of an air bag body are respectively nipped by positioning plates which are each fastened and fixed to a pillar inner panel by a weld nut and a bolt via the plates. Caulking portions are formed on the plates so that the mounting portions of the air bag device are in advance fixed between the plates. A convex portion is formed on the plate, and with the convex portion being engaged with a hole formed in the pillar inner panel, relative rotation of the plate and a vehicle body is prevented. As a result, rotation of the air bag body in a direction in which the mounting portions are fastened, which occurs during mounting of the air bag body to the vehicle body, can be prevented.

23 Claims, 11 Drawing Sheets

HEAD-PROTECTING AIR BAG DEVICE

BACKGROUND OF THE INVENTION

1. Field of the Invention

The present invention relates to a head-protecting air bag device in which gas is ejected from an inflator when a predetermined high load acts on a side portion of a vehicle body, so as to allow an air bag body accommodated along a pillar portion and a roof side rail portion to expand similarly to a curtain.

2. Description of the Related Art

There has already been proposed a head-protecting air bag device in which, in order to improve the ability to protect the head of a vehicle occupant seated in a front seat when a predetermined high load acts on a side portion of a vehicle body, an air bag body accommodated in a folded state over a region from a front pillar portion to a roof side rail portion is caused to expand along a side window glass similarly to a curtain. This type of head-protecting air bag device is disclosed in International Publication No. WO 96/26087 and will be described hereinafter.

As shown in FIG. 11, a head-protecting air bag device 100 is structured to include, as main components, an elongated duct 106 disposed to extend from a front pillar portion 102 to a roof side rail portion 104, an air bag body 112 accommodated in the duct 106 in a folded manner and fixed to the side of a vehicle body at a front-end fixed point 108 and at a rear-end fixed point 110, an inflator 116, which is connected via a hose 114 to the rear end of the duct 106 and when a predetermined high load acts on the side portion of the vehicle body, which the inflator ejects gas, and a band-shaped strap 118 of which one end is fixed to the side of the vehicle body and the other end is fixed to the rear end of the air bag body 112. The air bag device 112 is provided in such a manner that a plurality of cells 120, which are each formed substantially into a cylinder and are disposed with longitudinal direction thereof coinciding with the substantially vertical direction of the vehicle, are connected together.

According to the above-described structure, when a predetermined high load acts on the side portion of the vehicle body, gas is ejected from the inflator 116. For this reason, ejected gas is allowed to flow into each cell 120 of the folded air bag body 112 via the hose 114 and the duct 106. As a result, each cell 120 expands substantially into a cylinder with the longitudinal direction thereof coinciding with the substantially vertical direction of the vehicle, and the air bag body 112 is thereby inflated along a window glass 122 similarly to a curtain. Further, the rear end of the air bag body 112 is connected via the strap 118 to the side of the vehicle body, and therefore, the rear-end side of the air bag body 112 is reliably disposed at an inner side of the upper portion of a center pillar portion 124.

In such a head-protecting air bag device, in order that an upper end portion of the air bag body is fixed to the pillar and to the roof side rail at a plurality of positions, it is preferable to provide, from the viewpoint of assembling efficiency, a structure in which a plurality of tongue-shaped mounting portions are formed projecting in the upper end portion of the air bag body at predetermined intervals, and bolts are inserted into mounting holes respectively formed in the mounting portions so as to fasten the air bag body to a vehicle body.

However, as described above, in the above structure in which the tongue-shaped mounting portions are formed projecting in the upper end portion of the air bag body, and the bolts are inserted into the mounting holes respectively formed in the mounting portions so as to fasten the air bag body to the vehicle body, when the mounting portions are fastened to the vehicle body, each mounting portion may rotate in a direction in which the bolt is fastened and assembling efficiency is thereby deteriorated. Further, when the mounting portion rotates to apply tension to a portion between the rotated mounting portion and an adjacent mounting portion in the air bag body, there arises a drawback in that large tension acts on the portion between the adjacent mounting portions due to expansion force of the air bag body during expansion of the air bag body.

SUMMARY OF THE INVENTION

In view of the above-described facts, it is an object of the present invention to provide a head-protecting air bag device which can prevent rotation of mounting portions of an air bag body in a direction in which each mounting portion is fastened, which is caused when the air bag body is mounted on a vehicle body.

Accordingly, there is provided a head-protecting air bag device according to a first aspect of the present invention, in which an air bag body caused to expand similarly to a curtain is accommodated over a region from a pillar to a roof side rail and a plurality of mounting portions formed to project from an upper end portion of the air bag body are fastened and fixed to a side portion of a vehicle body, and in this head-protecting air bag device, the mounting portions are fastened and fixed to the side portion of the vehicle body using rotation stopping means.

The operation of the head-protecting air bag device according to the first aspect of the present invention will be described hereinafter.

When the air bag body is fastened to the vehicle body by a bolt or the like, even if the mounting portions are each about to rotate in a direction of being fastened, rotation of the mounting portions in the direction of being fastened can be prevented by the rotation stopping means. As a result, it is possible to prevent rotation of the air bag body in the direction in which the mounting portions are fastened, which the rotation is caused when the air bag body is mounted to the vehicle body, and therefore, no tension is applied to a region between adjacent mounting portions of the air bag body during mounting of the air bag body to the vehicle body and no large tension acts on the region between the adjacent mounting portions due to expanding force of the air bag body during expansion of the air bag body. Accordingly, breakage of the mounting portions can effectively be prevented.

A second aspect of the present invention is constructed in such a manner that, in the head-protecting air bag device according to the first aspect, the rotation stopping means is comprised of a positioning plate fixed in advance to the mounting portions of the air bag body, and engaging means which prevents relative rotation of the positioning plate and the vehicle body.

Accordingly, when the air bag body is fastened to the vehicle body by a bolt or the like, even if the mounting portions are each about to rotate in the direction of being fastened, relative rotation of the positioning plate fixed in advance to the mounting portions of the air bag body and the vehicle body can reliably be prevented by the engaging means. For this reason, there is no possibility that a tension is applied to the region between the adjacent mounting portions of the air bag body during mounting of the air bag body to the vehicle body, and during expansion of the air bag body, a large tension acts on the region between the adjacent mounting portions due to expanding force of the air bag body. Accordingly, breakage of the mounting portions can effectively be prevented.

A third aspect of the present invention is constructed in such a manner that, in the head-protecting air bag device according to the second aspect, the engaging means is comprised of a hole or a concave portion, which is formed in one of the positioning plate and the vehicle body, and a convex portion formed in the other of the positioning plate and the vehicle body and engaging with the hole or the concave portion.

Accordingly, when the air bag body is fastened to the vehicle body by a bolt or the like, even if the mounting portions are each about to rotate in the direction of being fastened, relative rotation of the mounting portions of the air bag body and the vehicle body can reliably be prevented by using a simple structure in which the hole or the concave portion, which is formed in one of the positioning plate and the vehicle body, and the concave portion formed in the other of the positioning plate and the vehicle body are engaged with each other. For this reason, there is no possibility that a tension is applied to the region between the adjacent mounting portions of the air bag body during mounting of the air bag body to the vehicle body, and during expansion of the air bag body, a large tension acts on the region between the adjacent mounting portions due to expanding force of the air bag body. As a result, breakage of the mounting portions can effectively be prevented.

A fourth aspect of the present invention is a head-protecting air bag device in which an air bag body caused to expand similarly to a curtain is accommodated over a region from a pillar to a roof side rail and a plurality of mounting portions formed to project from an upper end portion of the air bag body are fastened and fixed to a side portion of a vehicle body, and in this head-protecting air bag device, the mounting portions are fixed integrally to a pair of metal plates in a state of being held between the pair of metal plates.

Accordingly, the load acting on the mounting portions of the air bag body during expansion of the air bag body can be received by the overall length of each mounting portion irrespective of the state of the metal plates being mounted on the vehicle. As a result, no load acts directly on the upper side of the mounting hole formed in each mounting portion, and therefore, breakage of the mounting portions of the air bag body can effectively be prevented. Further, the pair of rigid metal plates are in advance fixed integrally to the mounting portions, which is excellent in the operating efficiency for mounting the mounting portions on the vehicle.

A fifth aspect of the present invention is a head-protecting air bag device in which an air bag body caused to expand similarly to a curtain is accommodated over a region from a pillar to a roof side rail and a plurality of mounting portions formed to project from an upper end portion of the air bag body are fastened and fixed to a side portion of a vehicle body, and in this head-protecting air bag device, a metal plate is fixed integrally to at least vehicle-interior inner sides of the mounting portions, and during expansion of the air bag body, a lower portion of the metal plate is bendingly deformable inwardly in the vehicle interior.

Accordingly, when the air bag body expands, a component force acting in the inward direction of the vehicle and applied to the mounting portions of the air bag body acts on the lower portion of the metal plate fixed integrally to the mounting portions and the lower portion of the metal plate bendingly deforms inwardly in the interior of the vehicle. As a result, the lower portion of the metal plate can be prevented from biting into the mounting portions of the expanded air bag body, and therefore, breakage of the mounting portions of the air bag body caused by the lower portion of the metal plate can be alleviated.

A sixth aspect of the present invention is constructed in such a manner that, in the head-protecting air bag device according to the fifth aspect, the metal plate is a pair of metal plates between which the mounting portions are held, the pair of metal plates being fixed by caulking together with the mounting portions, and a lower end of an outer shape of a bolt washer used for the fastening and fixing of the mounting portions and lower ends of caulked portions at the one of the metal plates, which is positioned further at an inner side of the interior of the vehicle than the other metal plate, the caulked portions being formed at both sides of the bolt washer in a longitudinal direction of the vehicle, are positioned substantially on a straight line.

Accordingly, when the load acting in the inward direction of the vehicle is applied from the expanded air bag body to the lower portion of the metal plate disposed further at the inner side of the interior of the vehicle than the other metal plate, the lower portion of the metal plate reliably bendingly deforms inwardly in the interior of the vehicle with lower ends of caulked portions on the metal plate and the lower end of the outer shape of the bolt washer as the center. As a result, it is possible to obtain the same effect, in that damage caused to the air bag body is alleviated as compared to that in a case in which an end of the lower portion of the metal plate is in advance subjected to bending processing. Accordingly, it is not necessary that the end of the lower portion of the metal plate be in advance bent by bending processing, and a yield of the metal plate is improved as compared with a yield obtained in a case in which the metal plate is in advance subjected to bending processing.

DESCRIPTION OF THE PREFERRED EMBODIMENTS

A description will be hereinafter given of a head-protecting air bag device according to a first embodiment of the present invention with reference to FIGS. 1 to 6.

It should be noted that arrows "FR", "UP", and "IN" shown in the accompanying drawings, respectively represent: the forward direction of a vehicle; the upward direction thereof; and an inward direction thereof relative to a transverse axis of the vehicle.

Figure 5:
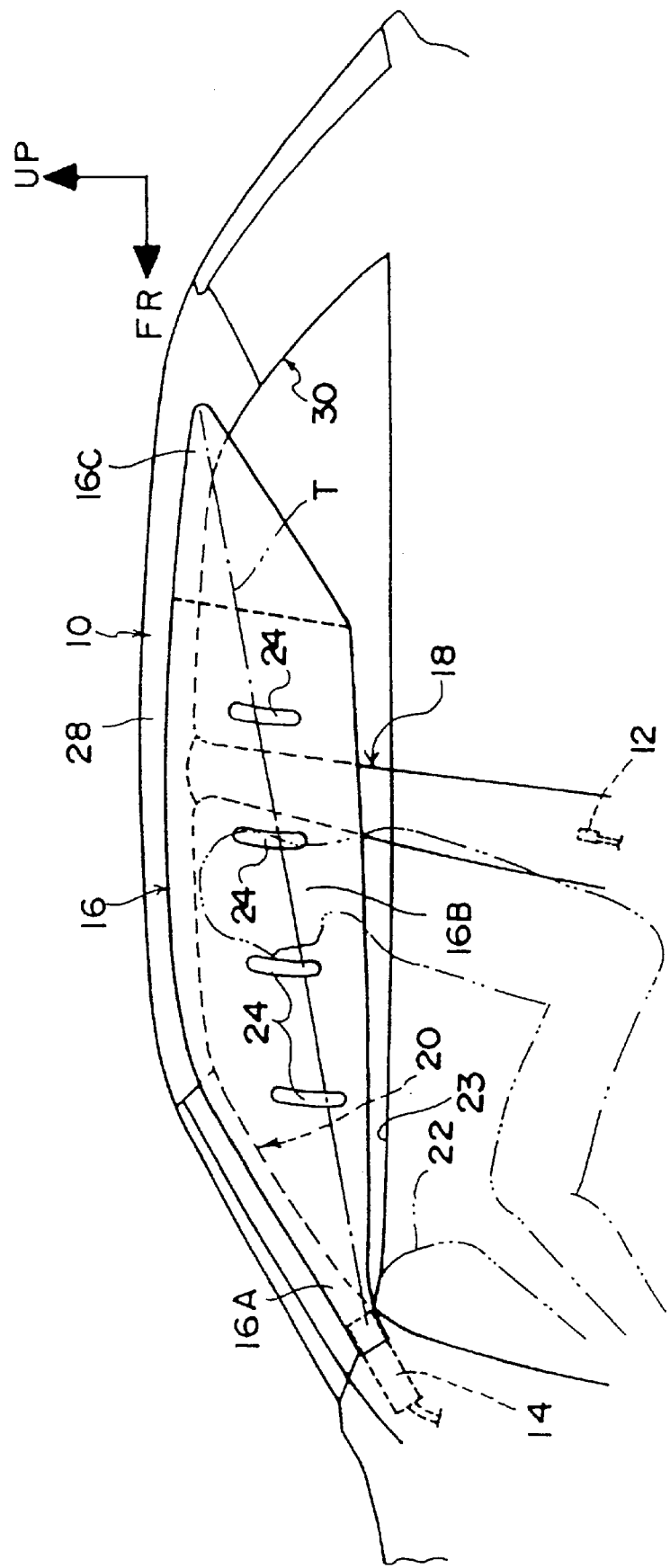
FIG. 5 is a side view which schematically shows a state in which the air bag body inflates to unfold in the head-protecting air bag device according to the first embodiment of the present invention.

As shown in FIG. 5, a head-protecting air bag device 10 of this embodiment is structured to include, as main components, a sensor 12 for detecting the state of side collision, a cylindrical inflator 14 which operates to eject gas, and an air bag body 16. The sensor 12 is disposed in the vicinity of the lower end of a center pillar (B pillar) 18, and when side-collision load of a predetermined value or more acts on a side portion of a vehicle body, the sensor 12 is provided to detect the state of side collision.

The inflator 14 is disposed near a portion where a front pillar (A pillar) 20 and an instrument panel 22 are connected, and is connected to the above-described sensor 12. Accordingly, when the state of side collision is detected by the sensor 12, the inflator 14 is made to operate.

A plurality of non-expansive portions 24 whose longitudinal direction coincides with the vertical direction of the air bag body from a side view are formed at intermediate portions of the air bag body 16 in the vertical direction in such a manner as to cross a tension line T which connects a front-side fixed point and a rear-side fixed point of the air bag body 16. These non-expansive portions 24 allows formation of a plurality of cylindrical expanding portions disposed substantially in parallel and provided to cross the tension line T during expansion of the air bag body.

The front end 16A of the air bag body 16 is disposed at a position where the inflator 14 is provided, so as to allow gas ejected from the inflator 14 to flow into the air bag body. An upper end edge of an intermediate portion 16B is disposed along the front pillar 20 and a roof side rail 28 and an upper end edge of the rear end 16C is disposed near a quarter pillar (C pillar) 30.

Figure 6:
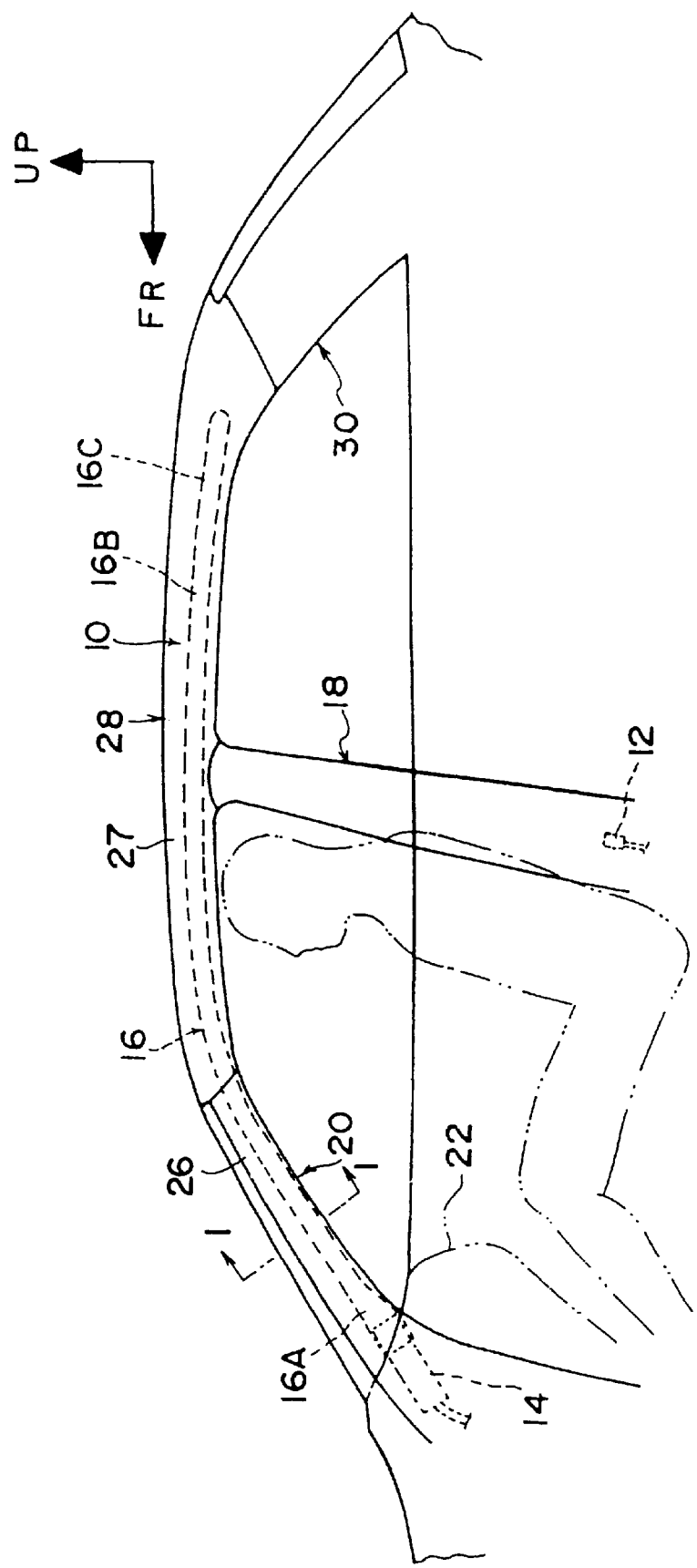
FIG. 6 is a side view which schematically shows a state in which the air bag body is accommodated in the head-protecting air bag device according to the first embodiment of the present invention.

As shown in FIG. 6, the air bag body 16 is accommodated over a region from a front pillar garnish 26 to a roof side rail garnish 27 (or an external edge of a roof head lining in the transverse direction of the vehicle) in such a manner as to be made elongated by being folded like a bellows substantially in the vertical direction of the vehicle.

Figure 4:
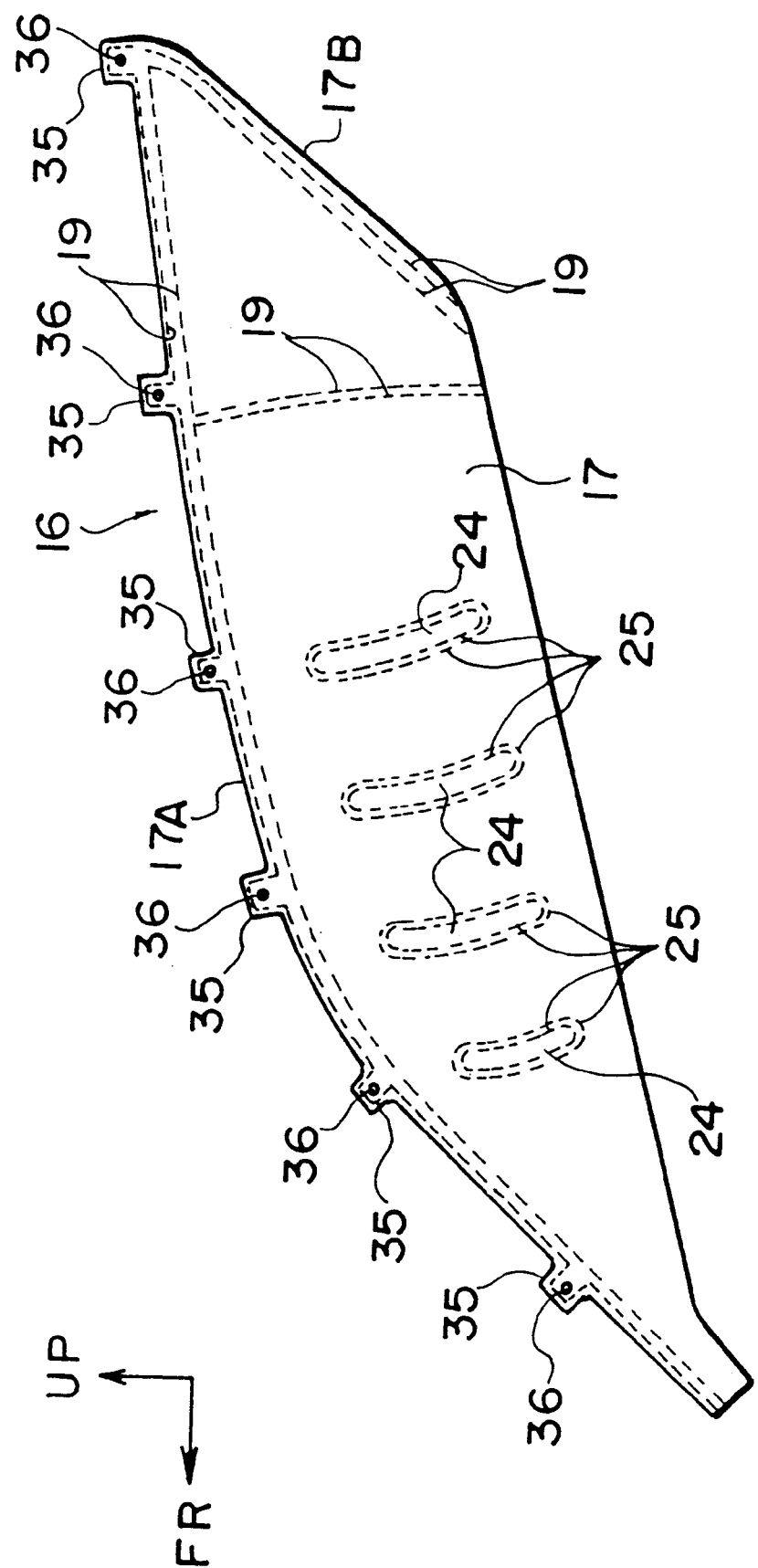
FIG. 4 is a side view which schematically shows an unfolded state of an air bag body in the head-protecting air bag device according to the first embodiment of the present invention.

As shown in FIG. 4, the air bag body 16 is formed in such a manner that one sheet of base cloth 17 to which a sealing agent is applied is folded over at the lower end thereof and an upper end edge potion 17A and a rear portion 17B, which are each brought into an overlapping state, are each stitched up by sewing threads 19. The air bag body 16 is formed substantially in the shape of a parallelogram and a plurality of rectangular tongue-shaped mounting portions 35 are formed so as to project from the upper end edge portion 17A. A mounting hole 36 is formed substantially in the central portion of each mounting portion 35 and a pitch of the mounting holes 36 is made longer than that of mounting holes formed at the side of the vehicle body and is also formed to be less than or equal to the length which can cover closely the front pillar 20 and the roof side rail 28 during expansion of the air bag body. The non-expansive portions 24 of the air bag body 16 are each formed by stitching with sewing threads 25.

Figure 1:
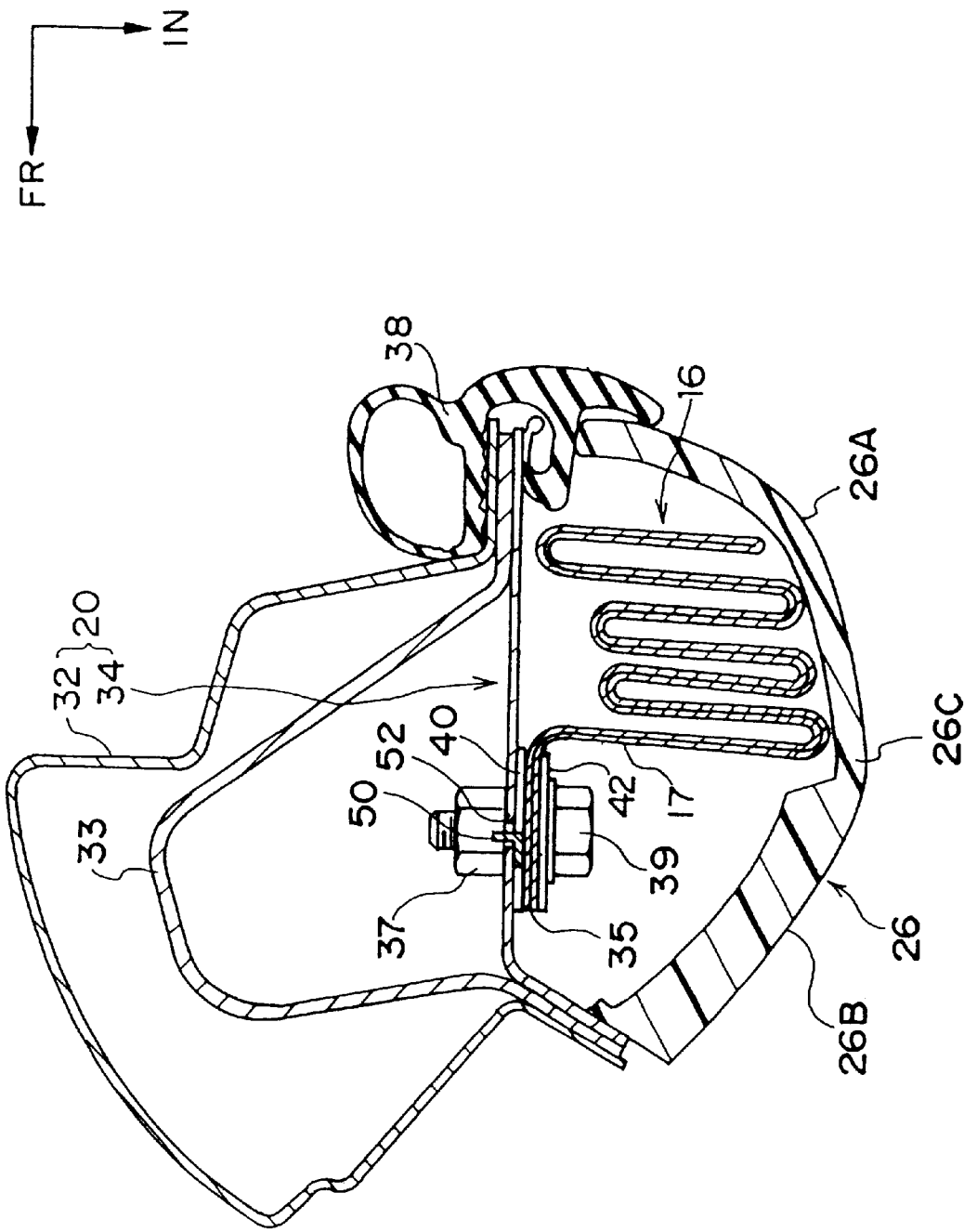
FIG. 1 is an enlarged cross-sectional view taken along the line 1—1 in FIG. 6.

As shown in FIG. 1, the front pillar 20 is formed to have a closed cross-sectional configuration by a pillar outer panel 32 having a hat-shaped cross-sectional configuration disposed at an exterior side of a vehicle interior, a pillar inner panel 34 formed substantially in the shape of a flat plate and disposed at an inner side of the vehicle interior, and a pillar reinforcer 33 having a substantially hat-shaped cross-sectional configuration and disposed to be held between the pillar outer panel 32 and the pillar inner panel 34. An opening weather strip 38 is elastically fitted to a rear-end flange portion of the front pillar 20.

A pillar garnish 26 made of resin is disposed further at an inner side of the vehicle interior than the pillar inner panel 34 of the front pillar 20. The pillar garnish 26 is formed from a thin-walled bag accommodating portion 26A and a thick-walled base portion 26B. When the air bag body expands, the bag accommodating portion 26A is provided to elastically deform to open with a hinge portion 26C formed on the border between the bag accommodating portion 26A and the base portion 26B as the center. The end portion of the pillar garnish 26 at the side of the bag accommodating portion 26A is elastically engaged with the opening weather strip 38.

A mounting portion 35 of the air bag body 16 is nipped by positioning plates 40 and 42 made of metal and serving as rotation stopping means and is also fastened and fixed to the pillar inner panel 34 by a weld nut 37 and a bolt 39 via these plates 40 and 42.

Figure 2:
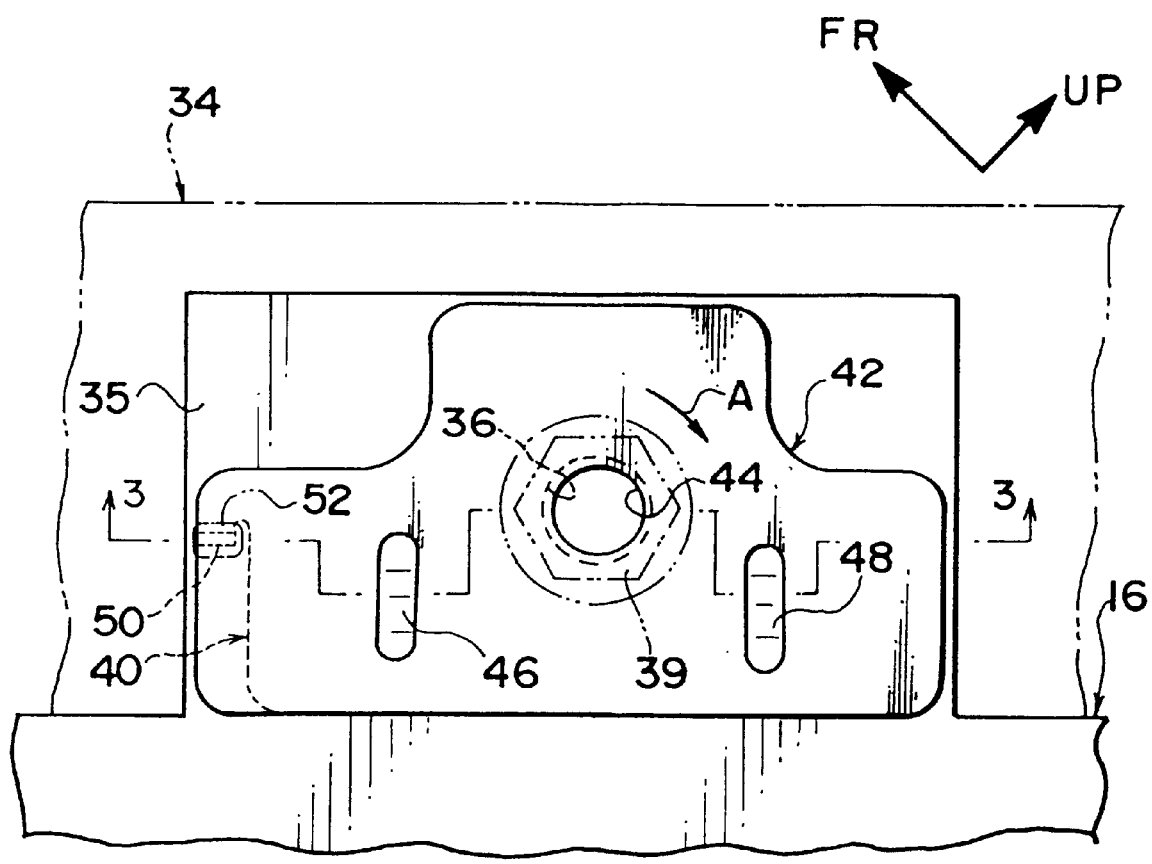
FIG. 2 is a side view when seen from an inner side of a vehicle, which shows, partially by virtual lines, a principal portion of a head-protecting air bag device according to a first embodiment of the present invention.

As shown in FIG. 2, a through hole 44 through which the bolt 39 passes is formed substantially at the central portion of these plates 40 and 42 and at the position coaxial with a mounting hole 36 of the mounting portion 35. Caulking portions 46 and 48 are formed on the plates 40 and 42 in the vicinities of both sides of the through hole 44 in the transverse direction of the paper of FIG. 2. The caulking portions 46 and 48 are used to fix the plates 40 and 42 to the mounting portion 35 of the air bag body 16 and to prevent movement of the mounting portion 35 between the plates 40 and 42. A claw-shaped convex portion 50 serving as engaging means is formed in such a manner that the front edge portion of the plate 40 located at the side of the pillar inner panel 34 is cut and bent upright.

Figure 3:
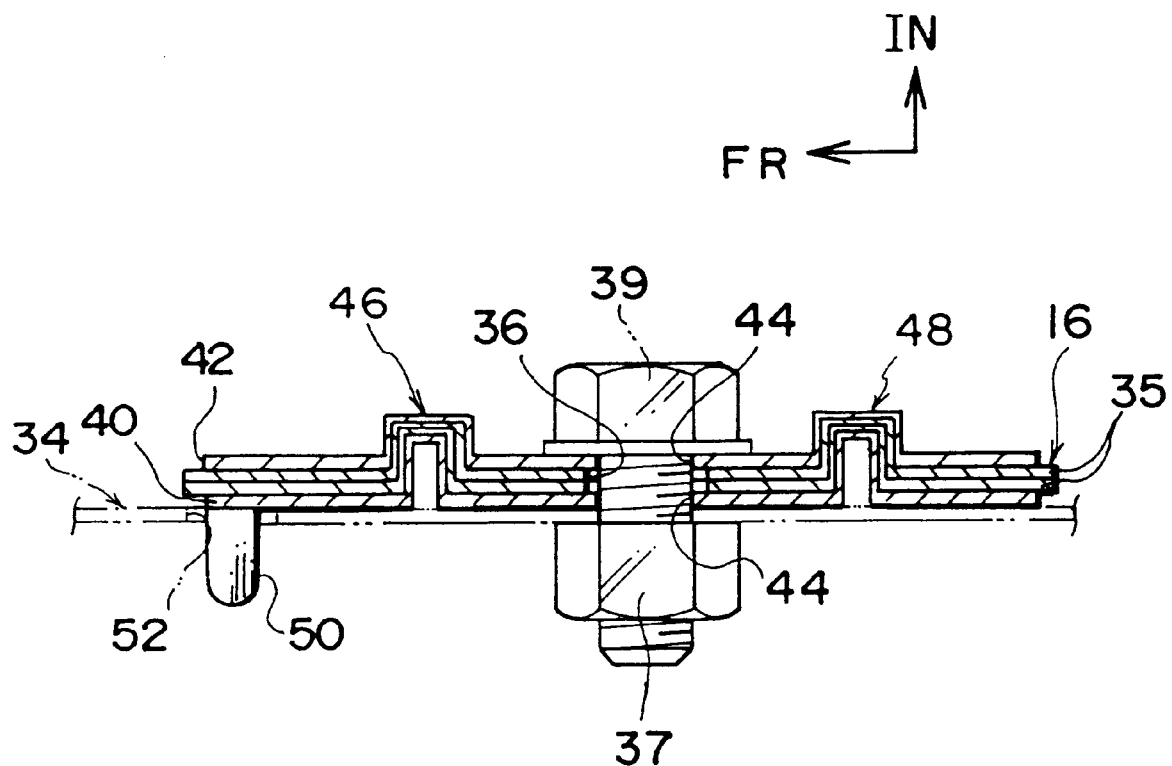
FIG. 3 is a cross-sectional view taken along the line 3—3 in FIG. 2.

As shown in FIG. 3, the convex portion 50 of the plate 40 is inserted into a hole 52 formed in the pillar inner panel 34 and serving as engaging means. With the convex portion 50 being engaged with the hole 52, relative rotation of the plate 40 and the pillar inner panel 34 (i.e., the vehicle body) is prevented.

Similarly, the mounting portion 35 of the air bag body 16 is also mounted at an inner panel of the roof side rail 28 via the plates 40 and 42.

Next, operation of the present embodiment will be described.

In the head-protecting air bag device 10 of the present embodiment, when the air bag body 16 is fastened to the pillar inner panel 34 by the bolt 39, even if the mounting portion 35 of the air bag body 16 is about to rotate in a direction of being fastened (i.e., the direction indicated by arrow A in FIG. 2), the convex portion 50 formed in the positioning plate 40 is engaged with the hole 52 formed in the pillar inner panel 34 or an inner panel of the roof side rail 28, so that relative rotation of the mounting portion 35 of the air bag body 16 with respect to the vehicle body is reliably prevented by a simple structure.

As a result, when the mounting portion 35 of the air bag body 16 is fastened to the vehicle body, no tension is applied to a region between the mounting portion 35 and its adjacent mounting portion 35. For this reason, there is no possibility that, during expansion of the air bag body, a large tension acts on the region between adjacent mounting portions 35 due to expanding force of the air bag body 16, thereby making it possible to effectively prevent breakage of the mounting portion 35. Further, mounting efficiency of the air bag body 16 to the vehicle body also improves.

Further, load acting on the mounting portion 35 of the air bag body 16 during expansion of the air bag body can be received by the overall length of the mounting portion 35 irrespective of the state of the metal plates 40 and 42 being mounted to the vehicle. As a result, there is no possibility that load acts directly on an upper side of the mounting hole 36 formed in the mounting portion 35, and therefore, breakage of the mounting portion 35 of the air bag body 16 can effectively be prevented. Further, a pair of rigid metal plates 40 and 42 are in advance fixed integrally to the mounting portion 35, which is excellent in an operating ability for mounting the mounting portion 35 to the vehicle.

Next, a second embodiment of the head-protecting air bag device according to the present invention will be described with reference to FIGS. 7 to 9.

It should be noted that the same members as those of the first embodiment will be denoted by the same reference numerals, and a description thereof will be omitted.

Figure 9:
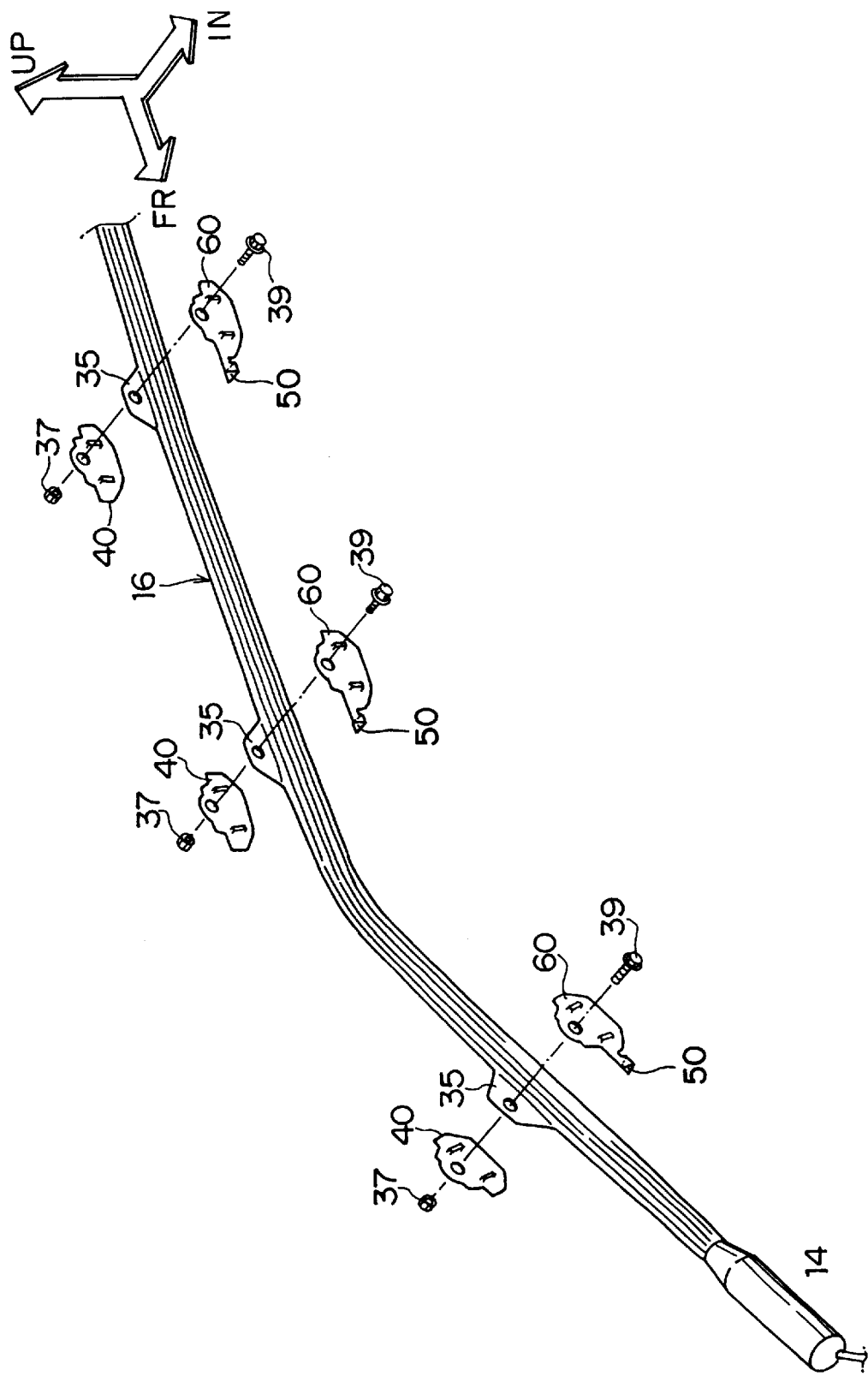
FIG. 9 is an exploded perspective view when seen from the front and inner side of the vehicle, which shows the principal portion of the head-protecting air bag device according to the second embodiment of the present invention.

As shown in FIG. 9, in this embodiment, the mounting portions 35 of the air bag body 16 are respectively nipped by a pair of metal plates 40 and 60 and are each fastened and fixed to a pillar inner panel and a roof side rail inner panel (both of which are not shown) by the weld nut 37 and the bolt 39 in such a manner as to be made integrally with the plates 40 and 60. In this embodiment, the claw-shaped convex portion 50 serving as engaging means is formed in such a manner that a front edge portion of the metal plate 60 disposed at the inner side of the interior of the vehicle is cut and bent upright, although in the first embodiment the convex portion 50 is formed in the metal plate 40 disposed at the exterior side of the interior of the vehicle.

Figure 7:
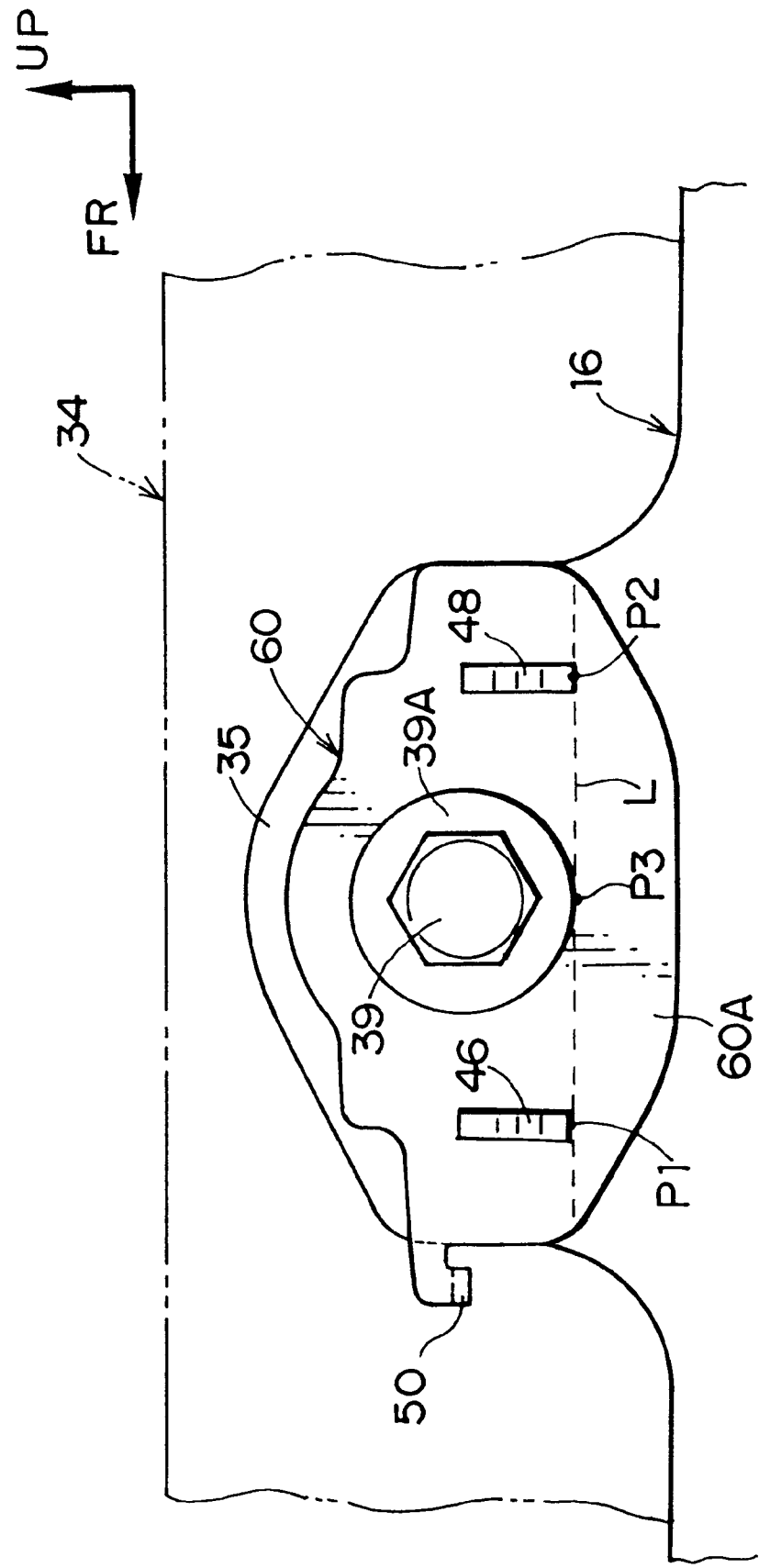
FIG. 7 is a side view when seen from an inner side of a vehicle, which shows, partially by virtual lines, a principal portion of a head-protecting air bag device according to a second embodiment of the present invention.

As shown in FIG. 7, in the metal plate 60 disposed further at the inner side of the interior of the vehicle than the mounting portions 35 of the air bag body 16, lower ends P1 and P2 of caulked regions by the caulking portions 46 and 48 and a lower end P3 of the outer shape of a bolt washer 39A are arranged substantially on a straight line L.

Figure 8:
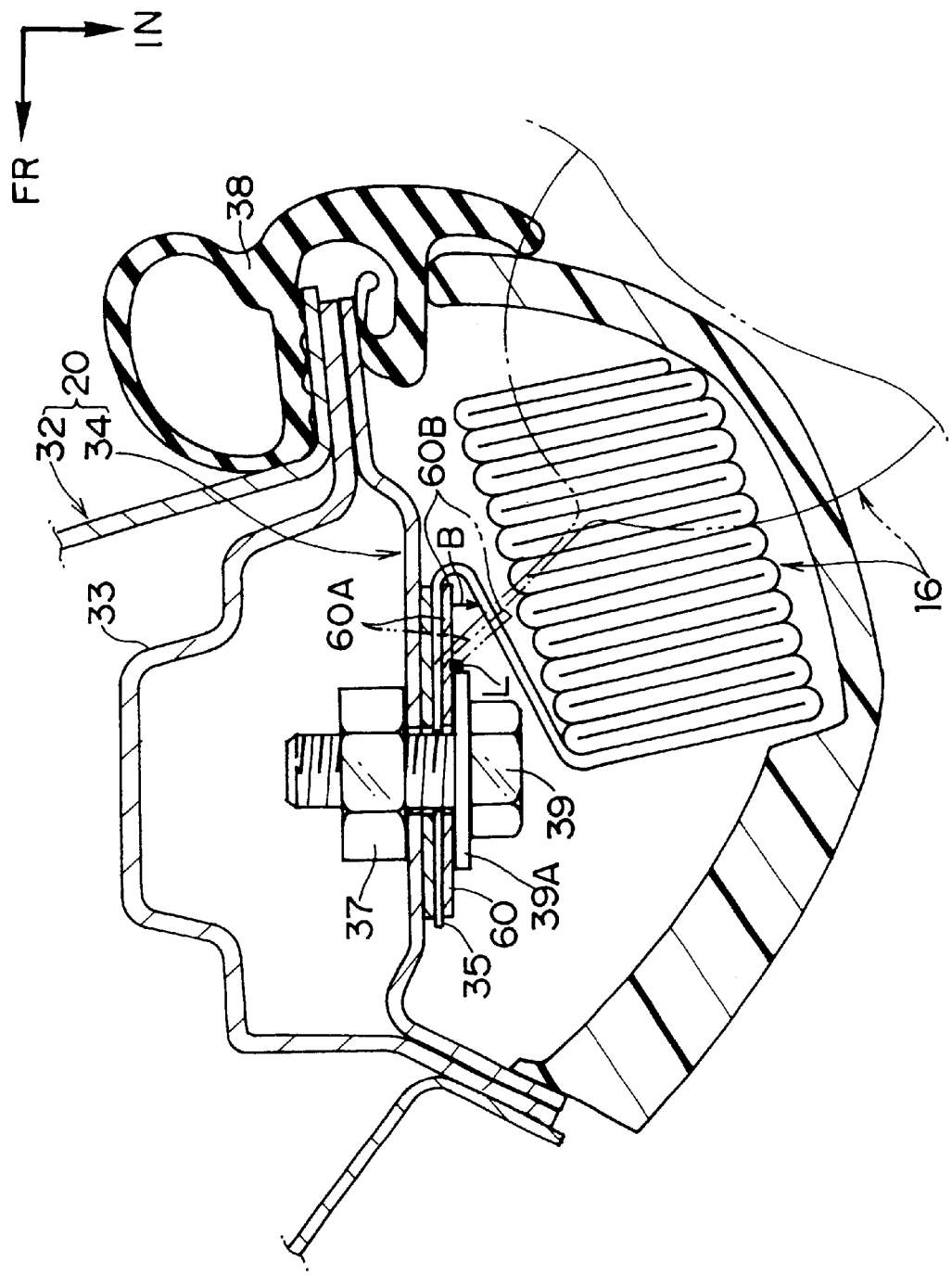
FIG. 8 is an enlarged cross-sectional view corresponding to FIG. 1, which shows a principal portion of the head-protecting air bag device according to the second embodiment of the present invention.

As a result, as shown in FIG. 8, when a load acts on a lower portion 60A of the metal plate 60 inwardly of the interior of the vehicle from the outer side of the vehicle (i.e., in the direction indicated by arrow B in FIG. 8), the lower portion 60A of the metal plate 60 is adapted to be easily bent in the inward direction of the vehicle (i.e., in the direction indicated by arrow B in FIG. 8) as indicated by the two-dot chain line with the straight line L as a bent line.

Next, operation of the second embodiment will be described.

In this embodiment, the mounting portions 35 of the air bag body 16 are fixed integrally by caulking or the like in such a manner as to be held by two sheets of metal plates 40 and 60, and therefore, the load acting on the mounting portions 35 of the air bag body 16 during expansion of the air bag body can be received by the overall length of each mounting portion 35 irrespective of the state of the metal plates 40 and 60 being mounted on the vehicle. As a result, no load directly acts on the upper side of the mounting hole 36 formed in each mounting portion 35, thereby making it possible to effectively prevent breakage of the mounting portions 35 of the air bag body 16. Further, the pair of rigid metal plates 40 and 60 are in advance fixed integrally to the mounting portions 35, which is excellent in operating efficiency for mounting the mounting portions 35 on the vehicle.

Further, in this embodiment, when load acting in the inward direction of the interior of the vehicle (i.e., in the direction indicated by arrow B in FIG. 8) acts, from the air bag body 16, on the lower portion 60A of the metal plate 60 disposed further at the inner side of the interior of the vehicle than the other plate, the lower portion 60A of the metal plate 60 is, as indicated by the two-dot chain line, easily bent toward the inner side of the interior of the vehicle (i.e., in the direction indicated by arrow B in FIG. 8) with the straight line L as the bent line. For this reason, the lower portion 60A of the metal plate 60 can reliably be bent to deform toward the inner side of the interior of the vehicle. As a result, it is possible to prevent an end edge 60B (see FIG. 8) of the lower portion 60A of the metal plate 60 from biting into the expanded air bag body 16, and therefore, breakage of the mounting portions 35 of the air bag body 16 caused by the edge 60B of the lower portion 60A of the metal plate 60 can be alleviated.

Moreover, this embodiment has the same effect in that damage caused to the air bag body is alleviated as compared to that in a case in which an end of the lower portion of the metal plate 60 is in advance subjected to bending processing, and therefore, it is not necessary that the end of the lower portion of the metal plate 60 be in advance subjected to bending processing. Accordingly, a yield of the metal plate 60 in this embodiment is improved as compared with a yield obtained in a case in which the metal plate 60 is in advance subjected to bending processing.

Figure 10:
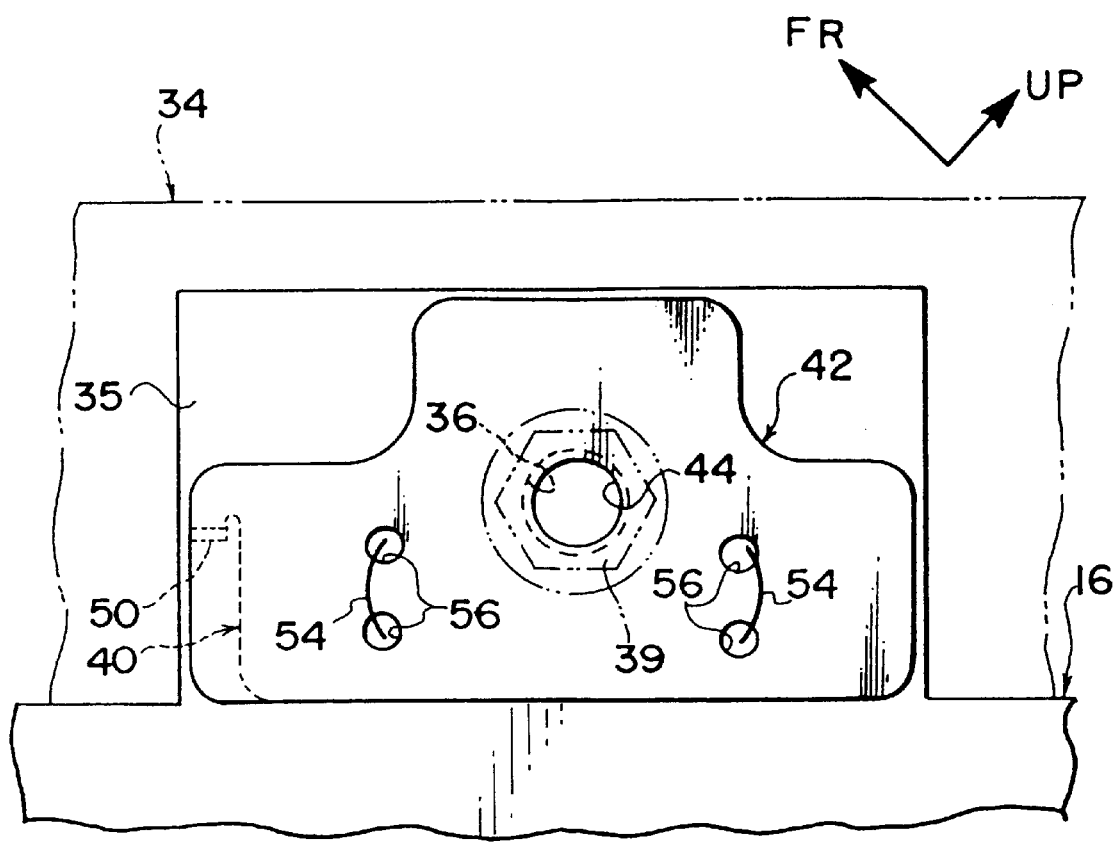
FIG. 10 is a side view when seen from an inner side of a vehicle, which shows, partially by virtual lines, a principal portion of a head-protecting air bag device according to a modified example of the first embodiment of the present invention.
Figure 11:
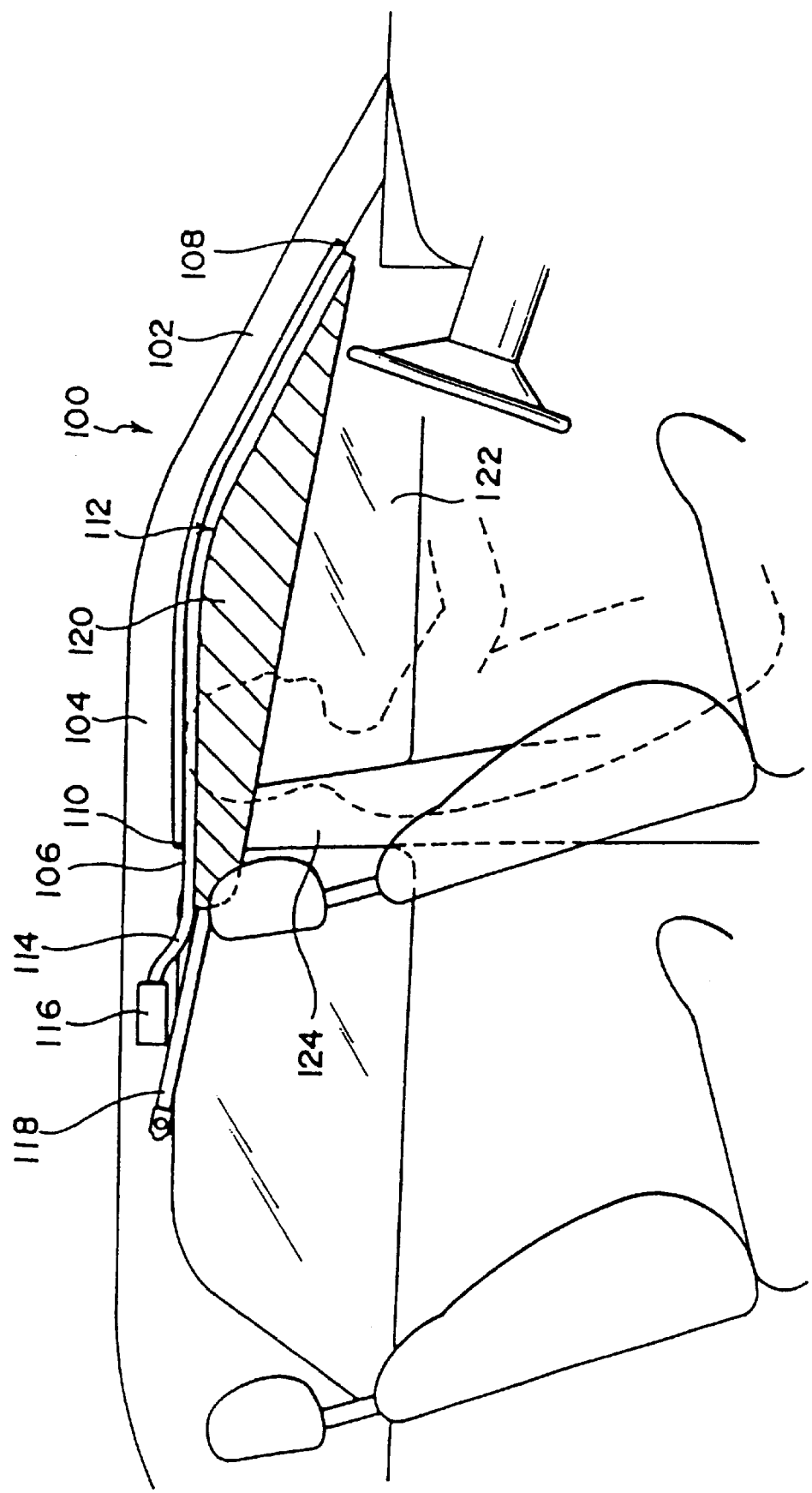
FIG. 11 is a side view which schematically shows a state in which expansion of an air bag body is completed in a conventional head-protecting air bag device.

Although the invention has been described in detail as related to specific embodiments, it is understood by those skilled in the art that the invention is not limited to the specific embodiments thereof and other various modifications may be made within the scope of the present invention. For example, in the first embodiment, the plates 40 and 42 are fixed to the mounting portions 35 of the air bag body 16 by the caulking portions 46 and 48 as shown in FIG. 2. However, as shown in FIG. 10, there may be applied a structure in which holes 56 are formed in the vicinities of both sides of the through hole 44 of the plates 40 and 42 in the transverse direction when seen from the paper of FIG. 10 and are used to allow stitching of each mounting portion 35 of the air bag body 16 between the plates 40 and 42 by a sewing thread 54. Alternatively, the plates 40 and 42 may also be fixed to the mounting portions 35 of the air bag body 16 by an adhesive.

As the hole 52 formed in the pillar inner panel 34 to serve as the engaging means, other engaging means such as a concave portion, a notch, and the like may also be used. Further, the convex portion 50 formed in the plate 40 may also be formed by other methods such as pressing without being cut and bent upright, in each of the present embodiments.

Meanwhile, when the folded air bag body 16 is disposed over a region from the front pillar 20 to the roof side rail 28 in such a manner as to be accommodated in an elongated case, it is desirable to provide rotation stopping means which is integrated with the case.

Further, the second embodiment is structured in such a manner that, as shown in FIG. 7, the lower ends P1 and P2 of the caulked positions by the caulking portions 46 and 48 of the metal plate 60 and the lower end P3 of the outer shape of the bolt washer 39A are arranged substantially on the straight line L, and during expansion of the air bag body, the lower portion 60A of the metal plate 60 is easily bent inwardly in the interior of the vehicle with the straight line L as the bent line. However, the present invention is not limited to the same. Other structures, for example, a structure in which the thickness of the metal plate 60 is made smaller along the straight line L, a structure in which a perforation is formed on the metal plate 60 along the straight line L, and the like, may also be used to allow the lower portion 60A of the metal plate 60 to be easily bent inwardly in the interior of the vehicle with the straight line L as the bent line during expansion of the air bag body.

Moreover, the head-protecting air bag device according to the present invention is also applicable to a structure in which an inflator is disposed at the side of the quarter pillar (C pillar) 30.

What is claimed is:

1. A head-protecting air bag device for mounting in a vehicle body having a side portion, the device comprising:
   an inflatable air bag body for accommodation in a vehicle body along a side portion thereof,
   the air bag body having an upper edge portion and a plurality of mounting portions formed at positions of the upper edge portion of the air bag body for fastening to the side portion of the vehicle body,
   a pair of reinforcing plates corresponding to each mounting portion, with each mounting portion being sandwiched between its respective pair of reinforcing plates and connected thereto, and
   a rotation stopper
      wherein each mounting portion is fastened and fixed to the side portion of the vehicle body using the rotation stopper when the air bag, device is mounted in a vehicle body, said upper edge portion of the air bag being flexible.

2. A head-protecting air bag device according to claim 1, wherein the side portion of the vehicle body is a front pillar inner panel.

3. A head-protecting air bag according to claim 1, wherein the vehicle body includes a roof side rail leaving an inner panel, and the side portion of the vehicle body comprises the said inner panel.

4. A head-protecting airbag device according to claim 1, wherein the rotation stopper is comprised of one of the reinforcing plates fixed in advance to the mounting portions of the air bag body, and an engaging device which prevents rotation of the reinforcing plate relative to the vehicle body, the engaging device being comprised of a hole or a concave portion, which is formed in one of the reinforcing plates and the side portion of the vehicle body, and a convex portion formed in the other of the reinforcing, plates and the side portion of the vehicle body and engaging with the hole or the concave portion.

5. A head-protecting air bag device according to claim 1, wherein the rotation stopper is comprised of one of the reinforcing plates fixed in advance to the mounting portions of the air bag body, and an engaging device which prevents rotation of the reinforcing plate relative to the vehicle body, the engaging device being comprised of a notch formed in one of the reinforcing plates and the side portion of the vehicle body, and a convex portion formed in the other of the reinforcing plates and the side portion of the vehicle body and engaging with the notch.

6. A head-protecting air bag device according to claim 4, wherein the hole is formed in the vehicle body and the convex portion is formed in one of the reinforcing plates.

7. A head-protecting air bag device according to claim 4, wherein the convex portion is formed by press working.

8. A head-protecting air bag device according to claim 4, wherein the convex portion is formed by cutting a portion and bending the portion upright.

9. A head-protecting air bag device for mounting in a vehicle body having a side portion, the device comprising:
   an inflatable air bag body for accommodation in a vehicle body along a side portion thereof,
   the air bag body having an upper edge portion and a plurality of mounting portions formed at positions along the upper edge portion of the air bag body for fastening to the side portion of the vehicle body, and
   a pair of reinforcing plates corresponding to each mounting portion,
   wherein each mounting portion is fixed between a pair of the reinforcing plates by caulking.

10. A head-protecting airbag device according to claim 9, wherein the pair of reinforcing plates are of substantially the same shape.

11. A head-protecting air bag device for mounting in a vehicle body having a side portion, the device comprising:
    an inflatable air bag body having an upper edge portion, and
    a plurality of mounting portions formed to project from the upper edge portion of the air bag body for fastening to the side portion of the vehicle body,
    wherein each mounting portion is fixed integrally between a pair of metal plates,
    the pair of metal plates and the mounting portions being fixed together by the mounting portions being sewn between the pair of metal plates by passing a thread through holes provided in the pair of metal plates.

12. A head-protecting air bag device according to claim 9, wherein the mounting portions are integrally fixed and held between a pair of metal plates, and the pair of metal plates and the mounting portions are fastened and fixed to the side portion of the vehicle body using a rotation stopper when the air bag device is mounted in a vehicle body.

13. A head-protecting air bag device according to claim 12, wherein a lower portion of at least the one of the pair of metal plates, which is positioned further at the inner side of the interior of a vehicle than the other metal plate, is deformably bendable inwardly in the interior of a vehicle during expansion of the air bag body.

14. A head-protecting air bag device according to claim 12, wherein said rotation stopper is comprised of an engaging portion which is provided on the metal plate positioned at the inner side of the interior of the vehicle, and an engaged portion provided in the side portion of the vehicle body and engaged with the engaging portion.

15. A head-protecting air bag device for mounting in a vehicle body having a side portion, the device comprising an inflatable air bag body and a plurality of mounting portions formed to project from an upper end portion of the air bag body fastened and fixed to a side portion of a vehicle body when the device is mounted in a vehicle body, wherein, a first metal plate is fixed integrally to at least vehicle interior inner sides of the mounting portions, and during expansion of the air bag body, a lower portion of the metal plate is deformably bendable inwardly in the vehicle interior.

16. A head-protecting air bag device according to claim 15, wherein:

the mounting portions are held between the first metal plate and a second metal plate, the first and second metal plates forming a pair of metal plates, the pair of metal plates being fixed by caulking together with the mounting portions, and a lower end of an outer shape of a bolt washer used for the fastening and fixing of the mounting portions and lower ends of caulked portions at the first metal plate, said first metal plate being positioned further at an inner side of the interior of the vehicle than the second metal plate, and the caulked portions being formed at both sides of the bolt washer in a longitudinal direction of the vehicle, and positioned substantially along a straight line.

17. A head-protecting air bag device according to claim 15, wherein a thin-walled portion is formed in advance at a portion of the second metal plate.

18. A head-protecting air bag device according to claim 1, wherein each pair of reinforcing plates is caulked beforehand so as to be integrated with the air bag body prior to mounting in the vehicle.

19. A. head-protecting air bag device according to claim 1, wherein the stopper includes an engaging member integrally formed on one of the reinforcing plates, wherein said one of the reinforcing plates is made of metal, and the engaging member is engageable with the side portion of the vehicle.

20. A head-protecting air bag device according to claim 19, wherein at least a portion of said one of the reinforcing plates is deformable towards the interior of the vehicle body when the air bag is inflated.

21. A head-protecting air bag device for mounting in a vehicle body having a side portion, the device comprising:

an inflatable air bag body including a plurality of substantially non-expansive portions spaced along the side portion of the vehicle body when the air bag device is mounted therein, the non-expansive portions defining a plurality of expanding portions, which sequentially expand as the air bag body is inflated;

the air bag body having an upper edge portion and a plurality of mounting portions formed along the upper edge portion of the air bag body for mounting to the side portion of the vehicle body, and a pair of reinforcing plates corresponding to each mounting portion, with each mounting portion being sandwiched between its respective pair of reinforcing plates and connected thereto.

22. A head-protecting air bag device according to claim 21, wherein the vehicle body includes front and rear portions and the air bag body extends from the front portion of the vehicle body into the rear portion, when the air bag device is mounted in the vehicle body.

23. A head-protecting air bag device for mounting in a vehicle body having front, rear and side portions, the device comprising:

an inflatable air bag body having an upper edge portion and a plurality of mounting portions formed along the upper edge portion for fastening to the side portion of the vehicle body, and a pair of reinforcing plates corresponding to each mounting portion, with each mounting portion being sandwiched between its respective pair of reinforcing plates and connected thereto, wherein the air bag body extends along the front and rear portions of the vehicle body when the air bag device is mounted therein.

* * * * *